United States Patent

Wada et al.

[11] Patent Number: 5,603,541
[45] Date of Patent: Feb. 18, 1997

[54] BUMPER BEAM

[75] Inventors: Tsuneyuki Wada; Hideki Akiyama, both of Wako, Japan

[73] Assignee: Honda Giken Kogyo Kabushiki Kaisha, Tokyo, Japan

[21] Appl. No.: 531,591

[22] Filed: Sep. 22, 1995

[30] Foreign Application Priority Data

Sep. 30, 1994 [JP] Japan .................................... 6-259582

[51] Int. Cl.$^6$ ................................................ B60R 19/04
[52] U.S. Cl. ...................... 293/102; 293/126; 293/154; 29/897.2; 228/173.4
[58] Field of Search ............................ 293/21, 102, 126, 293/154, 155; 29/897.2; 228/173.4

[56] References Cited

U.S. PATENT DOCUMENTS 5,358,294 10/1994 Palmer .................................... 293/155

FOREIGN PATENT DOCUMENTS 319362 6/1989 European Pat. Off. .............. 293/126
116540 6/1985 Japan .................................... 293/102

Primary Examiner—Dennis H. Pedder
Attorney, Agent, or Firm—Armstrong, Westerman, Hattori, McLeland & Naughton

[57] ABSTRACT

A bumper beam which can be formed easily by simple bending works is provided. The bumper beam is formed into a U-shaped sectional shape having a vertical wall and upper and lower horizontal walls connected to the vertical wall by bending a sheet of metal plate. Each lengthwise end portion of the metal plate is formed with upper and lower tapering horizontal wall extension parts and an intermediate part separated from the horizontal wall extension parts by cut-out spaces. The intermediate part comprises upper and lower horizontal wall remaining parts separated from the horizontal wall extension parts by the cut-out spaces and a vertical wall extension part. The intermediate part is bent toward opening side of the U-shaped section with the horizontal wall remaining parts stacked and welded to the horizontal wall extension parts.

2 Claims, 2 Drawing Sheets

BUMPER BEAM

BACKGROUND OF THE INVENTION

This invention relates to a bumper of an automobile, and particularly to a bumper beam for reinforcing the bumper made of a resin.

The resin bumper has a plan view that at both ends of an center portion extending in a car width direction over the almost entire width are formed corner portions bent toward car body side so as to extend along side surfaces of the car body, and is shaped like a box opened toward the car body side. Therefore, the bumper beam to be extended along the bumper is also formed in the similar shape.

The bumper beam is manufactured by forming a metal plate. In the case that it is intended to reduce the weight of the bumper beam by using a high-tensile steel having a specially high tensile strength of 120 kgf/mm$^2$ class for example as the metal plate, it is very difficult to form the pumper beam having the above-mentioned shape by a drawing process together with the corner portion.

Hitherto, in such a case, the bumper beam (reinforce) was divided into a straight central portion having a U-shaped section (reinforce main body) and two corner portions (reinforce sides) of both ends and after the portions were formed independently of each other, the corner portions were welded to both ends of the central portion to construct the bumper beam, as shown in Japanese Patent Publication No. Hei 4-24259 and Japanese Patent Publication No. Hei 2-19328, for example.

Even in this case, it was common that only the central portion having a relatively simple shape was formed by bending of a high-tensile steel plate of 120 kgf/mm$^2$ class for example, and the corner portions having complicated shapes was formed by drawing of a relatively mild high-tensile steel plate of 60 kgf/mm$^2$ for example.

However, in the bumper beam constructed by welding the central portion and the corner portions which are formed as separate parts to each other as described above, many welding man-hour is required, material yield rate is poor and the cost rises because respective different dies are necessary for forming the central portion and the corner portions.

SUMMARY OF THE INVENTION

The present invention has been accomplished in view of the forgoing circumstance. According to the present invention, there is provided a bumper beam formed by bending a steel plate into a U-shaped section with a vertical wall and upper and lower horizontal walls connected to the vertical wall, in which each lengthwise end portion of the metal plate is formed with upper and lower tapering horizontal wall extension parts and an intermediate part separated from the horizontal wall extension parts by cut-out spaces, the intermediate part comprising upper and lower horizontal wall remaining parts separated from the horizontal wall extension parts by the cut-out spaces and a vertical wall extension part, and the intermediate part is bent toward opening side of the U-shaped section with the horizontal wall remaining parts stacked and welded to the horizontal wall extension parts.

In the bumper beam according to the present invention, the entire is formed as one part, therefore, the welding man-hour is reduced, material yield rate is good and the cost is low.

In addition, as the bumper beam is formed only by bending works, the entire can be formed well even with a high-tensile steel plate which has a large tensile strength but forming workability of is not good, and accordingly, a effective lightening of the bumper beam can be attempted.

Moreover, as a simple die for bending can be used for various products of different sizes in common, investment in equipment is reduced and the cost is further lowered.

DETAILED DESCRIPTION OF THE PREFERRED EMBODIMENT

Figure 1:
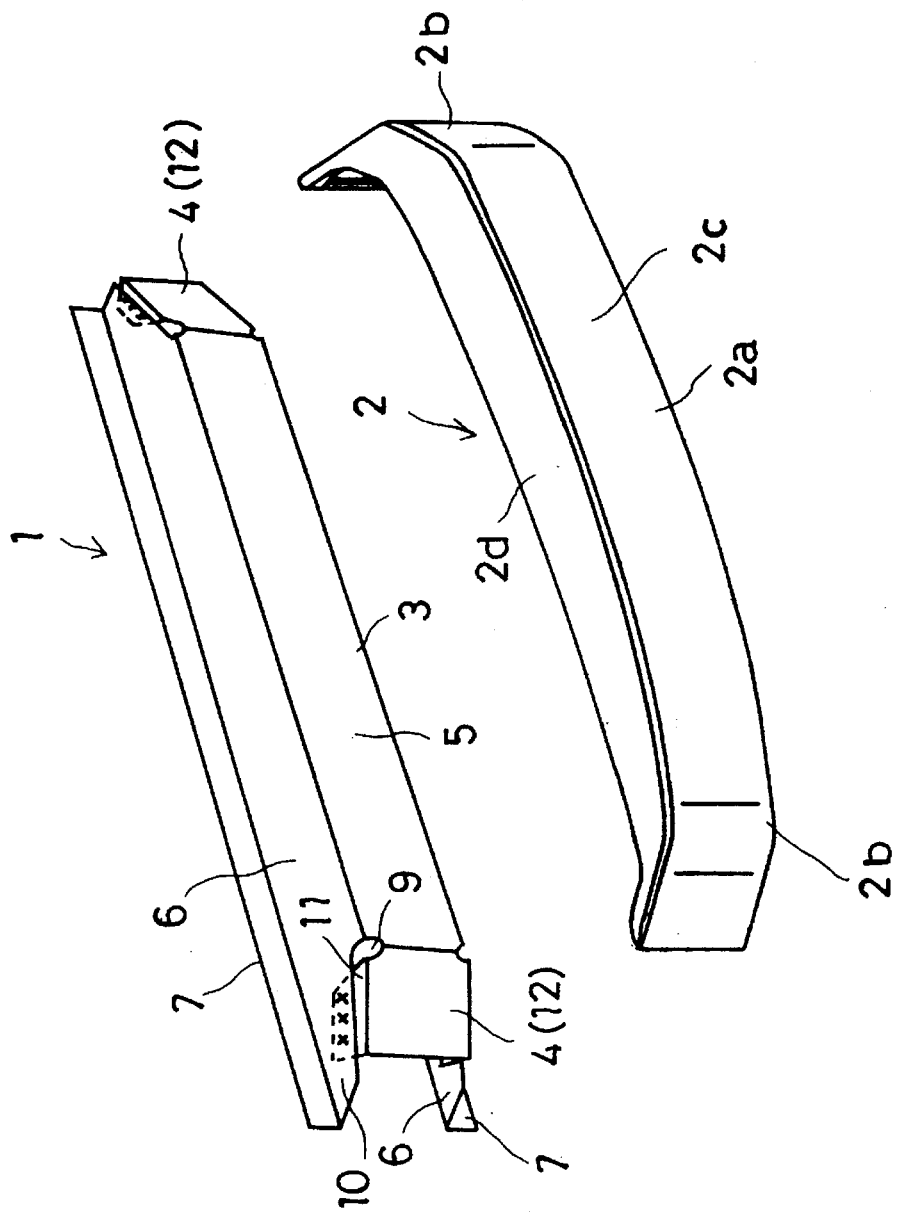
FIG. 1 is a perspective view showing a bumper beam according to a preferred embodiment of the present invention together with a bumper corresponding thereto.

FIG. 1 is a perspective view showing a bumper beam according to a preferred embodiment of the present invention together with a bumper corresponding thereto, in which 1 denotes the bumper beam and 2 denotes the bumper.

The bumper 2 is made of synthetic resin, rubber or the like, and provided on an end surface, a front surface for example, of a car body in an automobile to absorb a shock force applied to the car body. The bumper 2 has a central portion 2a extending linearly in a car width direction over the almost entire width. Corner parts 2b bent obliquely rearward are formed at the both ends of the central portion 2a and the both end parts of the bumper 2 extend through the corner parts 2b rearward along side surfaces of the car body.

The bumper 2 is composed of a vertical wall portion 2c forming a front surface and upper and lower horizontal wall portions 2d, and has a U-shaped section opening rearward namely toward the car body side. The bumper beam 1 enters into a recess of the bumper 2 formed according to the shape of the section from the rear to support the bumper 2. The bumper beam 1 is attached to the car body by a suitable stay (not shown).

Therefore, the bumper beam 1 has a shape corresponding to the bumper 2. That is, the bumper beam 1 has a central portion 3 corresponding to the central portion 2a of the bumper 2 and both side parts 4,4 inclined obliquely rearward corresponding to the corner parts 2b, and also has a vertical wall 5 corresponding to the vertical wall portion 2c and upper and lower horizontal walls 6,6 corresponding to the horizontal wall portions 2d which form a U-shaped section. 7 denotes a reinforcing flange formed by bending a rear edge of the horizontal wall 6.

The bumper beam 1 is formed by bending works of a sheet of metal plate. Hereinafter, the forming method will be described.

Figure 2:
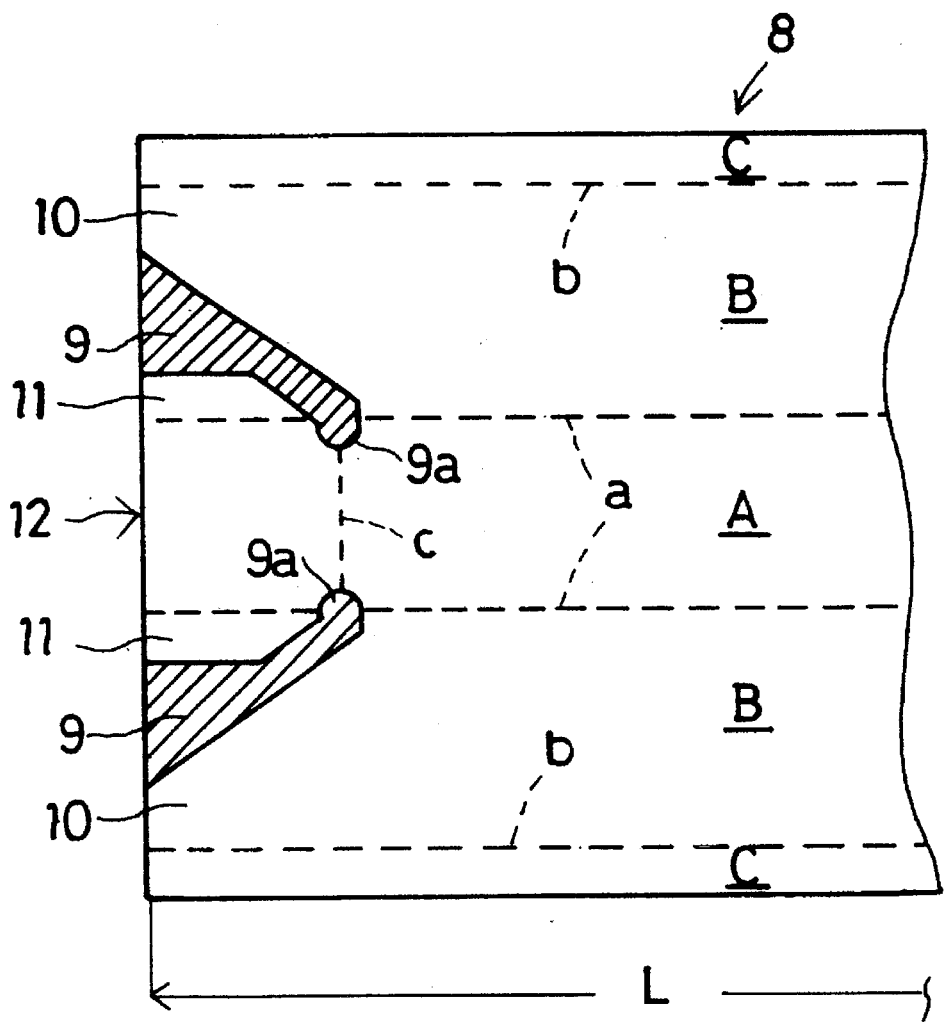
FIG. 2 is a plan view showing an end portion of a material metal plate of the bumper beam.

FIG. 2 is a plan view showing an end portion of the material metal plate 8 before forming. FIG. 2 also may be regarded as a plan view showing a developed state of the bumper beam 1 shown in FIG. 1. FIG. 2, the dotted lines a are bending lines between the vertical wall 5 and the horizontal walls 6 and the dotted lines b are bending lines between the horizontal walls 6 and the flanges 7. Therefore, A, B and C are portions corresponding to the vertical wall 5, horizontal wall 6 and flange 7, respectively.

Each end of each of portions B corresponding to the upper and lower horizontal wall is provided with a cut-out space 9 (shaded portion in FIG. 2). A tapering triangular horizontal wall extension part 10 continuing with the central portion of the portion B and a trapezoid horizontal wall remaining part 11 separated from the central portion of the portion B are formed on the end of the portion B, being separated from each other by the cut-out space 9.

The horizontal wall remaining part 11 is connected to the end part of the portion A corresponding to the vertical wall and together with the end part constitutes an intermediate part 12 extending from the portion B between the upper and lower horizontal wall extension part 10,10. The intermediate part 12 is bent along the bending line c in the forming process of the bumper beam 1 as is mentioned later. To facilitate the bending, inner ends 9a of the cut-out space 9 at both ends of the bending line c are somewhat swelled out toward the portion A side. Though FIG. 2 shows only one end of the metal plate 8, the other end is also shaped similarly.

When the bumper beam 1 shown in FIG. 1 is formed from the metal plate 8 shown in FIG. 2, first, the metal plate 8 is bent at right angles in predetermined directions along the bending lines a and b. By this process, the central portion 3 of the bumper beam 1 is completed. At this time, the intermediate part 12 exists on a extension of the vertical wall 5 with the upper and lower horizontal wall remaining parts 11 bent horizontally. Then, the intermediate part 12 is bent rearward along the bending line c with the horizontal wall remaining parts 11 put along horizontal wall extension part 10 and the remaining parts 11 and the extension parts 10 are welded to each other by spot welding or the like to form the both side parts 4 integral with the central portion 3.

The bumper beam 1 can be formed by applying only simple bending works to sheet metal plate 8 as described above, so that the bumper beam 1 can be formed entirely of a high-tensile steel plate of 120 kgf/mm$^2$ class which has a large tensile strength but forming workability of is not good. By using such a steel plate, thickness of the bumper beam can be reduced to remarkably reduce the weight.

Since the entire of the bumper beam 1 is constructed as a single article which is formed from only one sheet of metal plate 8, material yield rate is good. As for welding, it is sufficient to weld only the horizontal wall extension part 10 and horizontal wall remaining part 11 to each other, so that the welding man-hour can be reduced to lower the cost.

Since the number of required dies is small and moreover the same die can be used various products of different sizes, for example lengths L(FIG. 2), in common, the cost is further lowered.

What is claimed is:

1. A bumper beam formed by bending a metal plate into a U-shaped section with a vertical wall and upper and lower horizontal walls connected to the vertical wall, in which each lengthwise end portion of said metal plate is formed with upper and lower tapering horizontal wall extension parts and an intermediate part separated from said horizontal wall extension parts by cut-out spaces, said intermediate part comprising upper and lower horizontal wall remaining parts separated from said horizontal wall extension parts by said cut-out spaces and a vertical wall extension part, and said intermediate part is bent toward an opening side of said U-shaped section with said horizontal wall remaining parts stacked and welded to said horizontal wall extension parts.

2. A method of forming a bumper beam having a U-shaped section with a vertical wall and upper and lower horizontal walls connected to the vertical wall by bending a metal plate, comprising the steps of:

forming at each end portion of portions of said metal plate corresponding to said upper and lower horizontal walls a tapering horizontal wall extension part and a horizontal wall remaining part separated from said horizontal wall extension part by a cut-out space, whereby an intermediate part composed of upper and lower said horizontal wall remaining parts and a vertical wall extension part is formed between upper and lower said horizontal wall extension parts;

bending said portions corresponding to said upper and lower horizontal walls with respect to a portion corresponding to said vertical wall to form said U-shaped section;

bending said intermediate part toward an opening side of said U-shaped section; and welding said horizontal wall remaining parts to said horizontal wall extension parts.

* * * * *